United States Patent [19]

Rackowe

[11] Patent Number: 4,769,752
[45] Date of Patent: Sep. 6, 1988

[54] POWER SUPPLIES FOR ELECTRICAL AND ELECTRONIC EQUIPMENT

[75] Inventor: Miles D. A. B. Rackowe, Cambridge, Great Britain

[73] Assignee: Powertron Limited, Somersham, United Kingdom

[21] Appl. No.: 63,490

[22] Filed: Jun. 18, 1987

[30] Foreign Application Priority Data

Jun. 19, 1986 [GB] United Kingdom ............. 8615010

[51] Int. Cl.$^4$ .................. H02H 7/122; H02M 3/335
[52] U.S. Cl. ............................... 363/56; 363/21; 363/97; 323/908
[58] Field of Search ............. 363/20, 21, 56, 97, 363/131; 323/908

[56] References Cited

U.S. PATENT DOCUMENTS

| | | | |
|---|---|---|---|
| 3,112,435 | 11/1963 | Barney | 323/908 X |
| 4,254,443 | 3/1981 | Wilson, Jr. | 363/21 X |
| 4,435,746 | 3/1984 | Barnett | 363/21 |
| 4,593,213 | 6/1986 | Vesce et al. | 363/21 X |
| 4,631,470 | 12/1986 | Bingley | 323/908 X |

FOREIGN PATENT DOCUMENTS 2247816 9/1972 Fed. Rep. of Germany ...... 323/908

Primary Examiner—Peter S. Wong
Attorney, Agent, or Firm—Oldham & Oldham Co.

[57] ABSTRACT

A circuit for protecting an AC/DC, DC/AC or DC/DC convertor power supply which is fed from a supply source which may contain spikes or transients, comprising links of relatively lower and higher resistance connected in parallel in the current supply path from the power supply, and a feed back signal generator producing a feed back signal which varies responsively to variations in the power supply and is utilized to change the effective resistance of the low resistance link and thereby limit the current applied to the convertor transformer.

7 Claims, 3 Drawing Sheets

COMPONENT LIST

RESISTORS

| | |
|---|---|
| 14 | Voltage Dependent Type Z250D |
| 25 | 0.5R 2.5W |
| 26 | 33R 2.5W |
| 28 | 33R 2.5W |
| 42 | 4R7 |
| 44 | 4R7 |
| 62 | 68K |

CAPACITORS

| | |
|---|---|
| 40 | 68u 16V |
| 56 | 4.7u 250V |
| 58 | 470u 200V |
| 60 | 470u 200V |

DIODES

| | |
|---|---|
| 34 | RGP10J |
| 36 | RGP10J |
| 48 | BYV96E |
| 50 | 1N4005 |
| 52 | 1N4005 |
| 68 | 1N4005 |

INDUCTORS

| | |
|---|---|
| 22 | Type RMB 55.5t 0.56 |
| 38 | Type T51-26 35t 0.4 |

TRANSISTORS

| | |
|---|---|
| 30 | BUW46 |
| 64 | FET |

POWER SUPPLIES FOR ELECTRICAL AND ELECTRONIC EQUIPMENT

FIELD OF INVENTION

This invention concerns AC/DC, DC/AC and DC:DC converter power supplies for electrical and electronic equipment and in particular, to a circuit for protecting the converter and the supplied equipment against transients and spikes in the originating current supply to the converter.

BACKGROUND OF THE INVENTION

It is well established practice to convert power available at one voltage into power at a higher or lower voltage. However, as is well known, peak voltage spikes sometimes in excess of 10 times the originating nominal supply voltage, can occur for very short durations (of the order of a few microseconds). Such spikes can be (and usually are) removed by employing a voltage dependent resistor or the like across the power supply input from the originating supply. However, such devices are not well suited to remove longer duration spikes of lesser magnitude typically 2-3 times the nominal supply voltage.

It is an object of the present invention to provide a protection circuit for use in connection with a converter of the type described, which will protect the converter render the converter output largely insensitive to these longer duration spikes.

SUMMARY OF THE INVENTION

According to the present invention in a power supply adapted to be supplied from a supply source there is provided in the supply path a low resistance current link and in parallel therewith a higher resistance current link and circuit means responsive to the magnitude of the current drawn from the supply source which generates a feedback signal having a parameter which varies in the same manner as the current flowing from the supply source along the supply path, the feedback signal being capable of progressively increasing the effective resistance of the low resistance link with increasing supply current and to effectively open circuit the low resistance link if the supply voltage reaches a predetermined value so as to thereafter force the supply current to flow through the high resistance link, thereby at all times limiting the supply current.

In the event of an excessive excursion occurring in the supply voltage to the circuit, the resulting current is limited by the low resistance link becoming open circuited thereby forcing the current to flow through the high resistance link. A more modest excursion may not cause the low resistance link to become open circuit but merely to reduce the conduction through it thereby still limiting the current flowing.

Preferably the low resistance link comprises the emitter-collector path through a power transistor and the feedback signal determines the base current available to the transistor, circuit means supplying the base serving to reduce the current flowing to the base with increasing supply current.

Typically the source of feedback signal comprises a resistor in series with the emitter of the transistor which serves to reduce the bias current to the base-emitter junction to reduce the current flowing through the device.

Although any convenient source of direct current may be employed, a preferred bias source for the transistor may comprise a source of emf derived from a bias winding on the converter transformer the output current from which either flows to the base or is diverted through a forwardly biased diode (or series of diodes), once the sum of the base-emitter voltage and the voltage developed across the resistor in series with the emitter equals the voltage across the forwardly biased diode (or series of diodes).

Since the signal from the bias winding on the converter transformer will be an alternating current signal, a rectifying circuit must be incorporated to convert the alternating current signal to a direct current signal which is suitable for supplying the base of the transistor.

The invention will now be described by way of example with reference to the accompanying drawing in which:

FIG. 3 is a component listing.

Figure 1:
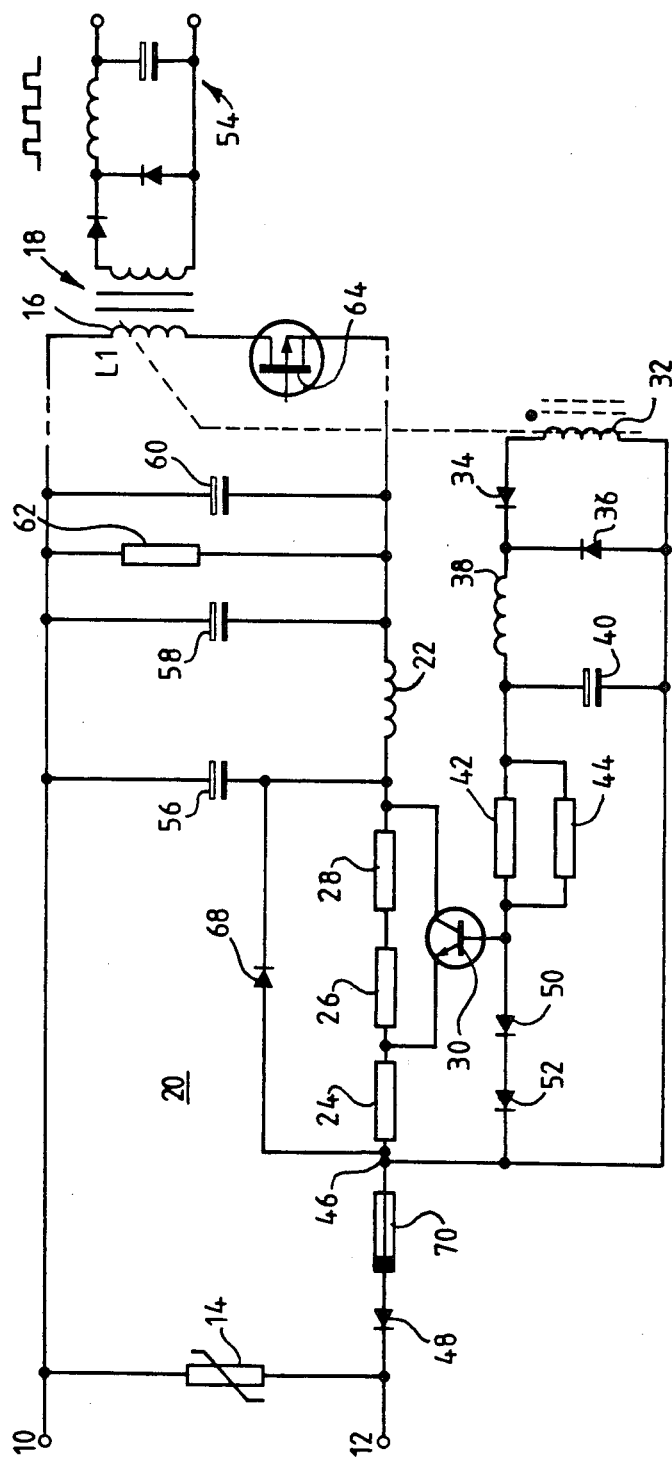
FIG. 1 is a circuit diagram of part of a converter power supply.

In FIG. 1 the input terminals 10, 12 are bridged by a voltage dependent resistor 14 (typically a type 2250D). Terminal 10 is connected directly to one end of a winding 16 forming part of an converter transformer 18. The other terminal 12 is connected to the other end of the winding 16 via a current limiting circuit generally designated 20, an inductor 22 and a power FET (or the like) the action of which is to repetitively interrupt the current flowing in the winding 16 to produce induced currents in the other windings of the transformer 18 in known manner.

The current limiting circuit, wherein the invention lies, includes a first series resistor 24, a resistive link of higher resistance value, made up conveniently from two series connected resistors 26, 28 and a power transistor 30 the emitter and collector of which are connected to opposite ends of the series resistor pair 26 and 28.

Base current for the transistor is derived from a source of emf comprising a bias winding 32 forming one of the windings of the converter transformer 18, a diode rectifying circuit made up of diodes 34, 36 (type RGP 10J) and an inductor 38 and capacitor 40. Connection to the base is made via a parallel connected pair of resistors 42, 44.

Whilst the positive side of the base current supply is connected to the resistors 42, 44, the other side of the supply is connected to a junction 46 between the resistor 24 and a diode 48 (typically a type BYV 96E).

Also connected to the junction 46 is a pair of series connected diodes 50, 52 (typically type IN 4005). By connecting the two in series so a forward voltage drop across the two diodes of 1.6 v is needed before forward conduction of the diodes occurs. In known manner, the conduction through the diodes after forward conduction occurs prevents any significant increase in the voltage across the diodes. Any further increase in voltage across 24 combines with the fixed forward voltage across 50–52 so as to begin to turn off transistor 30 by causing more of the current available for the base to flow through 50–52.

The value for inductor 38 forms an integrating network with capacitor 40 and is selected with reference to the frequency of operation of the converter in order to ensure a constant bias voltage across capacitor 40.

Capacitors 56, 58 and 60 must be discharged on turn-off, and to this end a high resistance "bleed" is provided at 62.

The converter functions by switching a power FET device 64 at a high repetition rate to produce a pseudo alternating current in the primary winding 16 of the transformer 18. High frequency interference due to feedback to the input terminals 10, 12 is cut down by the use of the inductor 22 and capacitor 56.

A diode 68 (type IN 4005) prevents the voltage across the transistor 30 from being accidentally reversed.

The transistor 30 may be a bipolar device such as type BU W46 or may be a power FET device, thus reducing the power requirements for the base current supply.

A fast response fuse may be fitted as shown at 70 to safeguard the equipment in the event of a transient causing a breakdown which results in a short circuit between the emitter and collector of the transistor 30.

The protection circuit of the invention has the advantage that during a voltage spike, current continues to flow into the load, but is limited either by the transistor 30 or by the resistive path made up of 26 and 28.

It is to be understood that the resistors 26 and 28 could be replaced by a single resistor of suitable value as could the two resistors 42 and 44. Likewise the two diodes 50 and 52 could be replaced by a low voltage Zener diode or the like.

Furthermore, it will be seen that any increase in emf from the winding 32 after the diodes 50, 52 have begun to conduct will not increase the base current to the transistor 30 which with increasing voltage being developed across resistor 24, will begin to rapidly turn off.

OPERATION

Figure 2:
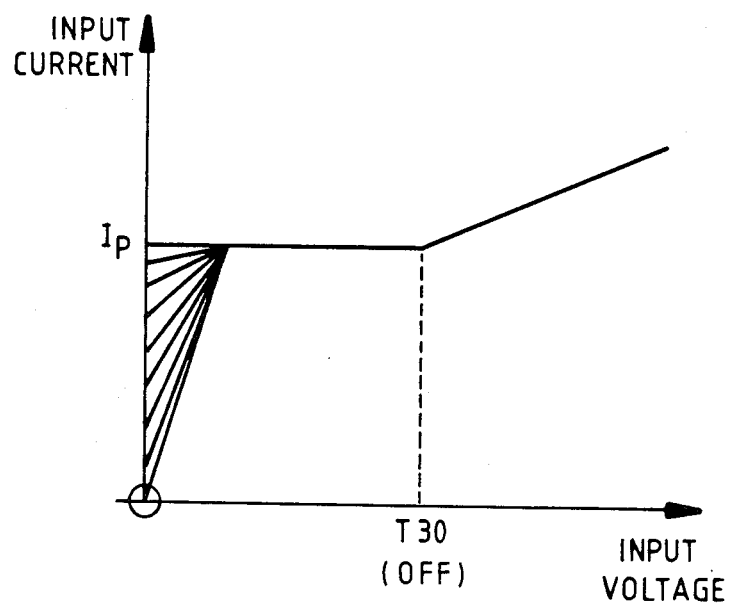
FIG. 2 illustrates graphically the input current flow relative to input voltage after a step in the input voltage occurs.

The protection circuit operates so as to limit the voltage supplied to the transformer 18 in the event of a sudden surge of voltage at the input. This is best seen by reference to FIG. 2 where the resulting increase in input current is plotted against voltage, following a sudden increase (ie step) in input voltage.

Thus during the initial period of a surge, the input current is limited only by the resistor 24 and the conduction through the transistor 30. This latter relies on the base current derived from winding 32.

Under all steady state conditions of supply and load the base current is sufficient to saturate transistor 30. This occurs up to such time as the voltage of the base of transistor 30 equals 1.6 v (ie the forward voltage across the diodes 50–52.)

With increasing supply current resulting from the voltage surge, the voltage developed across the diodes combines with the increasing voltage drop across resistor 24 to begin the process of turning off transistor 30. During the process of turning off the transistor the voltage across the capacitors 56, 58, 60 remains approximately constant despite a high input voltage, since in this phase the input current is merely transferring from the transistor to the resistors 26, 28.

After turn-off of 30, the purely resistive characteristic of the resistors 24, 26 and 28 predominates and the current continues to increase in line with the input voltage, the slope of the curve depending on the total value of the resistance of 24, 26 and 28.

It will be seen that if a sudden excursion occurs in the input voltage, there will be a rise in input current up to a predetermined threshold. This value of current will be maintained throughout the remainder of the excursion unless the voltage of the excursion is such as to cause the transistor to become turned off, whereupon the current will thereafter increase at a rate governed by the much higher resistance of 26 and 28 in which the energy in the voltage excursion will be dissipated.

At the end of an excessive voltage excursion the circuit resets to its normal condition with the transistor 30 saturated and conducting and with the average current flowing being determined by the output load.

The invention thus provides a protection circuit which continues to supply power to the supplied equipment during voltage surges on the input, whilst preventing the voltage across the capacitors 56, 58, 60 from rising to a level which would cause damage to the components of the converter.

I claim:

1. In a supply path from an electrical supply source to a convertor power supply, said source generating a supply voltage which may be subject to transient excursions, a protective circuit comprising:

a transistor having an emitter-collector current path therethrough which constitutes a low resistance current link between the supply source and the converter power supply, the magnitude of the current flowing being controlled by the base current of the transistor;

a current link of higher resistance connected in parallel with the low resistance current link;

a path having impedance connected in series between the supply source and the parallel-connected links;

a bias source for controlling the base current of the transistor; and a diverting circuit connected between the bias source, the transistor base and the said impedance path, said circuit including forwardly biased diode means connected between the transistor base and the said impedance path to change the transistor base current if the sum of the voltages across the base-emitter path and across the impedance path begins to increase in value towards the forward bias of said diode means, thereby to increase the effective resistance of the low resistance current link with increasing current from the supply source and eventually to open circuit the low resistance link by switching off the transistor if the supply voltage rises to a predetermined value during a transient voltage excursion.

2. A protection circuit according to claim 1, in combination with a voltage-dependent resistor bridging the input from said supply source.

3. A protection circuit according to claim 1, wherein said bias source for the transistor comprises a source of emf derived from a bias winding on a convertor transformer.

4. A protection circuit according to claim 3, including a rectifying circuit for converting an alternating current signal derived from said bias winding into a direct current signal applied to the transistor base.

5. A protection circuit according to claim 4, wherein the rectifying circuit includes an inductor and a capacitor having values selected in dependence on the frequency of operation of the converter to develop a constant bias voltage.

6. A protection circuit according to claim 1, wherein a diode for preventing reversal of voltage at the transistor is connected in parallel across the series connected feed back signal source and low resistance link.

7. A protection circuit according to claim 1, wherein the circuit connection between the feed back signal source and the emitter of the transistor includes a fast-response fuse.

* * * * *